Patented Oct. 20, 1953

2,656,353

UNITED STATES PATENT OFFICE 2,656,353

SENSITIZING DYES CONTAINING A 2-THIO-2,5(3,4)-THIAZOLEDIONE NUCLEUS

Roy A. Jeffreys and Edward B. Knott, Harrow, England, assignors to Eastman Kodak Company, Rochester, N. Y., a corporation of New Jersey No Drawing. Application December 29, 1950, Serial No. 203,526

12 Claims. (Cl. 260—240.4)

This invention relates to merocyanine dyes containing a 2-thio-2,5(3,4)-thiazoledione nucleus and to methods for preparing them.

Merocyanine dyes containing a 2-thio-2,4(3,5)-thiazoledione (rhodanine) nucleus have long been known. Some of these dyes have been found to be quite useful in increasing the sensitivity of photographic silver halide emulsions.

We have now found an entirely new class of merocyanine dyes which are quite useful as sensitizers for photographic silver halide emulsions.

It is, therefore, an object of our invention to provide a new class of merocyanine dyes. A further object is to provide methods for preparing these new dyes. Still another object is to provide photographic silver halide emulsions sensitized with these new dyes, and methods for preparing these emulsions. Other objects will become apparent from a consideration of the following description and examples.

According to our invention, we provide new merocyanine dyes represented by the following general formula:

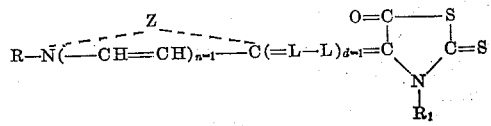

wherein R represents an alkyl group, such as methyl, ethyl, n-propyl, isopropyl, n-butyl, isobutyl, n-amyl, n-octyl, $\beta$-hydroxyethyl, $\beta$-chloroethyl, $\beta$-acetoxyethyl, etc. groups, (especially alkyl groups of the formula $C_mH_{2m+1}$ wherein $m$ represents a positive integer of from 1 to 8), $R_1$ represents an alkyl group, such as the acyclic alkyl groups defined by R above, as well as cycloalkyl groups, e. g. cyclopropyl, cyclobutyl, cyclopentyl, cyclohexyl, etc. (especially cycloalkyl groups containing from 3 to 6 carbon atoms in the cycloalkyl ring), L represents a methine group (substituted and unsubstituted, e. g., =CH—, =CR'— where R' represents an alkyl group, such as methyl, ethyl, etc.), $n$ represents a positive integer from 1 to 2, $d$ represents a positive integer from 1 to 3, and Z represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. $\alpha$-naphthothiazole, $\beta$-naphthothiazole, 5-methoxy-$\beta$-naphthothiazole, 5-ethoxy-$\beta$-naphthothiazole, 8-methoxy-$\alpha$-naphthothiazole, 7-methoxy-$\alpha$-naphthothiazole, etc.), those of the thionaphtheno-7',6',4,5-thiazole series (e. g. 4'-methoxythionaphtheno-7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. $\alpha$-napthoxazole, $\beta$-napthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. $\alpha$-naphthoselenazole, $\beta$-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the pyridine series (e. g. pyridine, 5-methylpyridine, etc.), etc.

According to the process of our invention, we prepare the merocyanine dyes of Formula I above where d is 2 or 3 by condensing a cyclammonium quaternary salt selected from those represented by the following general formula:

II

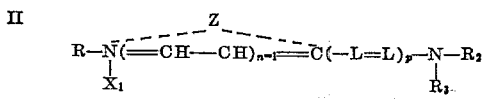

wherein R, L, Z, and n have the values set forth above, $R_2$ represents a hydrogen atom, an alkyl group (e. g. methyl, ethyl, etc.), or the acyl group of a carboxylic acid (e. g. acetyl, propionyl, etc.), $R_3$ represents an aryl group (e. g. phenyl, o-, m-, and p-tolyl, etc.), or $R_2$ and $R_3$ together represent the non-metallic atoms necessary to complete a heterocyclic nucleus (e. g. a piperidyl, morpholinyl, etc. nucleus), p represents a positive integer from 1 to 2, and $X_1$ represents an acid radical, e. g. $Cl^-$, $Br^-$, $I^-$, $C_2H_5SO_4^-$,

$SCN^-$, etc., with a 2-thio-2,5(3,4)-thiazoledione compound selected from those represented by the following general formula:

III

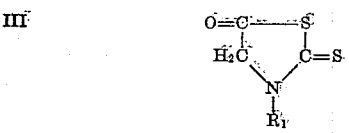

wherein $R_1$ has the values set forth above. The condensations are advantageously carried out in the presence of a basic condensing agent, e. g. the trialkylamines, such as triethylamine, tri-n-butylamine, etc., dialkylanilines, such as N,N-dimethyl-, N,N-diethylanilines, etc., heterocyclic tertiary amines, such as pyridine, quinoline, N-alkylpiperidines, etc., alkali metal alcoholates, such as sodium ethylate, etc. The condensations can also be carried out in the presence of an inert diluent, such as methanol, ethanol, n-propanol, isopropanol, n-butanol, diethyl ether, acetone, 1,4-dioxane, etc.

The merocyanine dyes of Formula I above where d is 1 can be prepared by condensing a cyclammonium quaternary salt selected from those represented by the following general formula:

IV

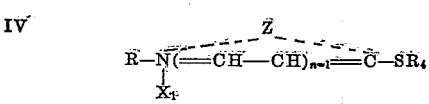

wherein R, Z, $X_1$, and n have the values set forth above, and $R_4$ represents an alkyl group, such as methyl, ethyl, etc., or an aryl group, such as phenyl o-, m-, and p-tolyl, etc., with a 2-thio-2,5(3,4)-thiazoledione selected from those represented by Formula III above. The condensations can advantageously be carried out in the presence of a basic condensing agent, such as the trialkylamines (e. g. triethylamine, tri-n-butylamine, etc.), dialkylanilines (e. g. N,N-dimethyl-, and N-N-diethylaniline, etc), heterocyclic tertiary amines (e. g. pyridine, quinoline, N-alkylpiperidines, etc.), alkali metal alcoholates (e. g. sodium methylate, sodium ethylate, etc.), etc. The condensations can also be carried out in the presence of an inert diluent, such as methanol, ethanol, n-propanol, isopropanol, n-butanol, isobutanol, diethyl ether, acetone, 1,4-dioxane, etc.

The following examples will serve to illustrate more fully the manner whereby we practice our invention.

*Example 1.*—[2 - (3 - methylthiazoline)][4 - (3-methyl - 2 - thio - 2,5(3,4) - thiazoledione)] dimethinemerocyanine

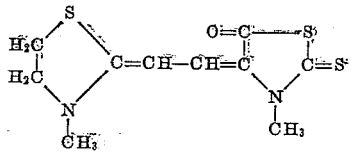

1.99 g. of 2-β-acetanilidovinylthiazoline methiodide and 0.73 g. of 3-methyl-2-thio-2,5 (3,4)-thiazoledione (Cook et al., "Jour. Chem. Soc." (1949), page 2340) were mixed with 8 cc. of ethanol and 0.7 cc. of triethylamine, and the reaction mixture was refluxed for 20 minutes on a steam bath. The reaction mixture was chilled and the precipitate collected on a filter. It was dissolved in warm ethanol, and the ethanol solution was then chilled. The desired dye separated as fluffy red needles melting at 134° C. It sensitized a gelatino-silver chloride emulsion with a maximum at 510 mμ.

*Example 2.*—[2 - (3 - ethylbenzoxazole)][4 - (3-methyl - 2 - thio - 2,5(3,4) - thiazoledione)] dimethinemerocyanine

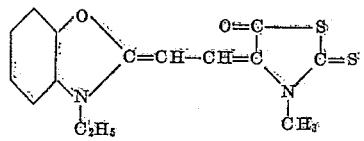

0.73 g. of 3-methyl-2-thio-2,5(3,4)-thiazoledione, 2.17 g. of 2-β-acetanilidovinylbenzoxazole ethiodide, 8 cc. of ethanol, and 0.7 cc. of triethylamine were heated under reflux for 30 minutes on a steam bath. The reaction mixture was chilled, and the precipitate collected on a filter. The precipitate was dissolved in warm benzene, and upon cooling the solution the desired dye separated as red fluffy needles melting at 270–271° C. It sensitized a gelatino-silver chloride emulsion with a maximum at 520 mμ and a gelatino-silver bromide emulsion with a maximum at 550 mμ.

*Example 3.*—[2-(3-methylbenzothiazole)][4-(3-methyl-2-thio-2,5(3,4)-thiazoledione)] merocyanine

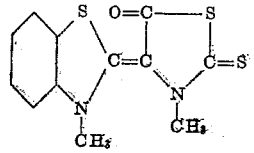

0.73 g. of 3-methyl-2-thio-2,5(3,4)-thiazoledione, 1.63 g. of 2-methylthiobenzothiazole methiodide, 8 cc. of ethanol, and 0.7 cc. of triethylamine were heated under reflux for 20 minutes on a steam bath. The reaction mixture was chilled and the precipitate collected on a filter. The desired dye was obtained as red prisms melting at 240° C. on recrystallization from a mixture of benzene and petroleum ether. It sensitized a gelatino-silver chloride emulsion with a maximum at 450 mμ.

*Example 4.*—[2 - (3 - ethylbenzoxazole)][4 - (3-methyl-2-thio-2,5(3,4)-thiazoledione)] tetramethinemerocyanine

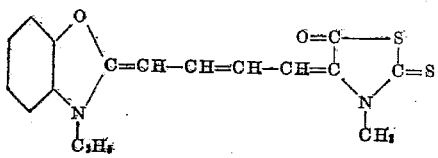

0.73 g. of 3-methyl-2-thio-2,5(3,4)-thiazoledione, 2.30 g. of 2-(δ-acetanilido-1,3-butadienyl) benzoxazole ethiodide, 8 cc. of ethanol and 0.7 cc. of triethylamine were heated under reflux for 20 minutes on a steam bath. The reaction mixture was cooled and the precipitate collected on a filter. It formed blue prisms with a melting point of 268° C. upon recrystallization from pyridine. It sensitized a gelatino-silver chloride emulsion with a maximum at 620 mμ and a gelatino-silver bromide emulsion with a maximum at 650 mμ.

Example 5.—[2-(1-ethylquinoline)][4-(3-methyl-2-thio-2,5(3,4)-thiazoledione)] dimethinemerocyanine

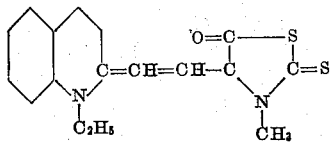

0.73 g. of 3-methyl-2-thio-2,5(3,4)-thiazoledione, 2.22 g. of 2-β-acetanilidovinylquinoline ethiodide, 8 cc. of ethanol, and 0.7 cc. of triethylamine were refluxed together for 20 minutes on a steam bath. The reaction mixture was then chilled, and the precipitate collected on a filter. The desired dye was obtained by recrystallizing the precipitate from ethanol. It was obtained in the form of dark green needles having a melting point of 273–274° C. It sensitized a gelatino-silver chloride emulsion with a flat maximum lying between 560 and 590 mμ, and a gelatino-silver bromide emulsion with a maximum at 600 mμ.

Example 6.—[2-(3-ethylbenzothiazole)][4-(3-methyl-2-thio-2,5(3,4)-thiazoledione)] dimethinemerocyanine

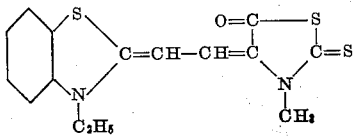

This dye was prepared by the same manner as the dye of Example 1 above by replacing the 2-β-acetanilidovinylthiazoline methiodide by a molecularly equivalent amount of 2-β-acetanilidovinylbenzothiazole ethiodide. The desired dye was obtained as lustrous gray needles upon recrystallization from pyridine. It melted at 314° C., and sensitized a gelatino-silver chloride emulsion with a maximum at 560 mμ and a gelatino-silver bromide emulsion with a maximum at 590 mμ.

Example 7.—[2-(3-ethylbenzoselenazole)][4-(3-methyl-2-thio-2,5(3,4)-thiazoledione)] dimethinemerocyanine

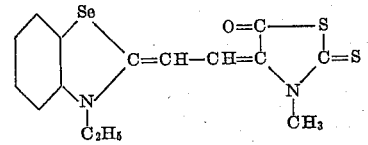

The dye was prepared in the same manner as the dye of Example 1 by replacing the 2-β-acetanilidovinylthiazoline methiodide by a molecularly equivalent amount of 2-β-acetanilidovinylbenzoselenazole ethiodide. The desired dye was obtained as dark gray prisms upon recrystallization from pyridine. It melted at 308° C., and sensitized a gelatino-silver chloride emulsion with a maximum at 570 mμ and a gelatino-silver bromide emulsion with a maximum at 600 mμ.

Example 8.—[4-(1-ethylquinoline)][4-(3-methyl-2-thio-2,5(3,4)-thiazoledione)] dimethinemerocyanine

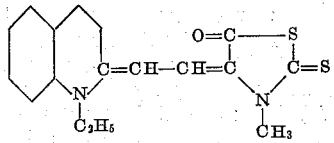

This dye was prepared in the same manner as the dye of Example 1 by replacing the 2-β-acetanilidovinylthiazoline methiodide with a molecularly equivalent amount of 2-β-acetanilidovinylquinoline ethiodide. The desired dye was obtained as dark gray prisms upon recrystallization from a mixture of pyridine and diethyl ether. It melted at 242° C., and sensitized a gelatino-silver bromide emulsion with a maximum at 640 mμ.

Example 9.—[2-(3-ethylbenzothiazole)][4-(3-ethyl-2-thio-2,5(3,4)-thiazoledione)] tetramethinemerocyanine

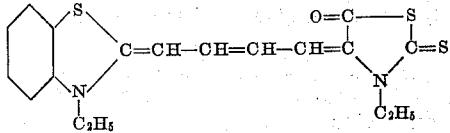

This dye was prepared in the same manner as the dye of Example 1 by replacing the 2-β-acetanilidovinylthiazoline methiodide with a molecularly equivalent amount of 2-(δ-acetanilido-1,3-butadienyl) benzothiazole ethiodide and the 3-methyl-2-thio-2,5(3,4)-thiazoledione by a molecularly equivalent amount of 3-ethyl-2-thio-2,5(3,4)-thiazoledione. The desired dye was obtained as a blue-gray powder upon recrystallization from methanol. It melted at 208° C. and sensitized a gelatino-silver bromide emulsion with a maximum at 700 mμ.

Example 10.—[2-(3-methylbenzothiazole)][4-(3-ethyl-2-thio-2,5(3,4)-thiazoledione)] merocyanine

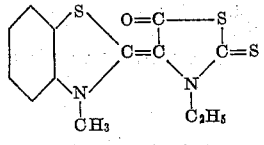

This dye was prepared in the same manner as the dye of Example 3 by replacing the 3-methyl-2-thio-2,5(3,4)-thiazoledione by a molecularly equivalent amount of 3-ethyl-2-thio-2,5(3,4)-thiazoledione. The desired dye was obtained in the form of long red needles with a green reflex upon recrystallization from ethanol. It melted at 176° C. and sensitized a gelatino-silver chloride emulsion with a maximum at 450 mμ.

Example 11.—[2-(3-ethylbenzothiazole)][4-(3-cyclohexyl-2-thio-2,5(3,4)-thiazoledione)] tetramethinemerocyanine

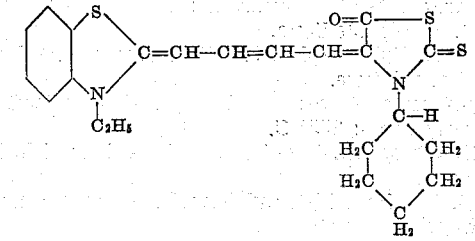

This dye was prepared in the same manner as the dye of Example 1 by replacing the 2-β-acetanilidovinylthiazoline methiodide with a molecularly equivalent amount of 2-(δ-acetanilido-1,3-butadienyl) benzothiazole ethiodide, and the 3-methyl-2-thio-2,5(3,4)-thiazoledione by a molecularly equivalent amount of 3-cyclohexyl-2-thio-2,5(3,4)-thiazoledione. The desired dye was obtained in the form of a dark green, microcrystalline powder upon recrystallization from a mixture of chloroform and petroleum ether. It melted at 228° C., and sensitized a gelatino-silver bromide emulsion with a flat maximum lying between 650 and 740 mμ.

The dimethinemerocyanine dyes in the following examples were prepared by refluxing on a steam bath for 20 minutes a mixture of 0.005 mol. of the 2-β-acetanilidovinylcyclammonium quaternary salts of Formula II and 0.005 mol. of the 3-alkyl-2-thio-2,5(3,4)-thiazolediones of Formula III shown in the examples in the presence of 8 cc. of ethanol and 0.7 cc. of triethylamine. The reaction mixtures were then chilled and the respective precipitates collected on a filter. The dyes were then recrystallized from the solvents shown in the examples. The appearance and melting point of the dyes are also given in the examples.

*Example 12.*—[2 - (3 - ethylbenzoxazole)] [4-(3 - ethyl - 2,5(3,4 - thiazoledione)] dimethinemerocyanine

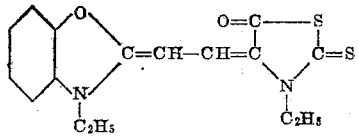

Intermediate of Formula II: 2-β-acetanilidovinylbenzoxazole ethiodide.
Intermediate of Formula III: 3-ethyl-2-thio-2,5-(3,4)-thiazoledione.
Recrystallizing solvent: Benzene/petroleum ether mixture.
Appearance of dye: Maroon needles.
Melting point: 228° C.

This dye sensitized a gelatino-silver chloride emulsion with a maximum at 520 mμ and a gelatino-silver bromide emulsion with a maximum at 560 mμ.

*Example 13.*—[2-(3-ethylbenzothiazole)] [4-(3-ethyl-2-thio - 2,5(3,4)-thiazoledione)] dimethinemerocyanine

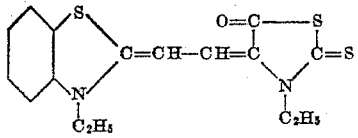

Intermediate of Formula II: 2-β-acetanilidovinylbenzothiazole ethiodide.
Intermediate of Formula III: 3-ethyl-2-thio-2,5-(3,4)-thiazoledione.
Recrystallizing solvent: Chloroform/petroleum ether mixture.
Appearance of dye: Metallic, gray-brown leaflets.
Melting point: 255° C.

This type sensitized a gelatino-silver chloride emulsion with a maximum at 570 mμ and a gelatino-silver bromide emulsion with a flat maximum between 570 and 600 mμ.

*Example 14.*—[2-(1-ethyl - β - naphthothiazole)] [4 - (3 - ethyl - 2 - thio - 2,5(3,4) - thiazoledione)] dimethinemerocyanine

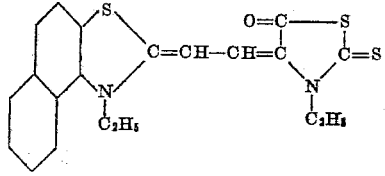

Intermediate of Formula II: 2-β-acetanilidovinyl-β-naphthothiazole ethiodide.
Intermediate of Formula III: 3-ethyl-2-thio-2,5-(3,4)-thiazoledione.
Recrystallizing solvent: Pyridine.
Appearance of dye: Fine, gray-green prisms.
Melting point: 281° C.

This dye sensitized a gelatino-silver chloride emulsion with a maximum at 590 mμ.

*Example 15.*—[2 - (3 - ethylthiazoline)] [4 - (3-ethyl - 2 - thio - 2,5(3,4) - thiazoledione)] dimethinemerocyanine

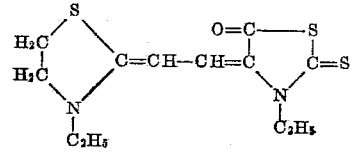

Intermediate of Formula II: 2-β-acetanilidovinylthiazoline ethiodide.
Intermediate of Formula III: 3-ethyl-2-thio-2,5-(3,4)-thiazoledione.
Recrystallizing solvent: Benzene/petroleum ether mixture.
Appearance of dye: Dark red prisms.
Melting point: 194° C.

This dye sensitized a gelatino-silver chloride emulsion with a maximum at 510 mμ and a gelatino-silver bromide emulsion with a maximum at 540 mμ.

*Example 16.*—[2 - (3 - ethylbenzoselenazole)] [4 - (3 - ethyl - 2 - thio - 2,5(3,4) - thiazoledione)] dimethinemerocyanine

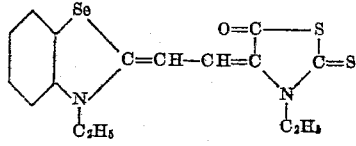

Intermediate of Formula II: 2-β-acetanilidovinylbenzoselenazole ethiodide.
Intermediate of Formula III: 3-ethyl-2-thio-2,5-(3,4)-thiazoledione.
Recrystallizing solvent: Pyridine/petroleum ether mixture.
Appearance of dye: Olive-green needles.
Melting point: 234° C.

This dye sensitized a gelatino-silver chloride emulsion with a maximum at 580 mμ, and a gelatino-silver bromide emulsion with a flat maximum lying between 580 and 620 mμ.

*Example 17.*—(2 - (1 - ethylquinoline)] [4 - (3-ethyl - 2 - thio - 2,5(3,4) - thiazoledione)] dimethinemerocyanine

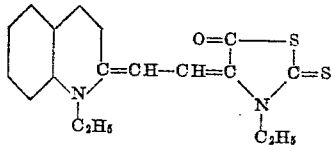

Intermediate of Formula II: 2-β-acetanilidovinylquinoline ethiodide.

Intermediate of Formula III: 3-ethyl-2-thio-2,5(3,4)-thiazoledione.
Recrystallizing solvent: Benzene/petroleum ether mixture.
Appearance of dye: Yellow-green plates.
Melting point: 241° C.

This dye sensitized a gelatino-silver chloride emulsion with a maximum at 580 mμ and a gelatino-silver bromide emulsion with a maximum at 620 mμ.

*Example 18.*—[2 - (3 - methylthiazoline)][4 - (3 - ethyl - 2 - thio - 2,5(3,4) - thiazoledione)] - dimethinemerocyanine

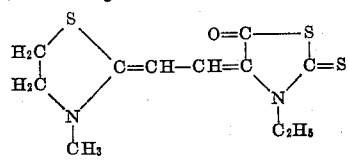

Intermediate of Formula II: 2-β-acetanilidovinylthiazoline methiodide.
Intermediate of Formula III: 3-ethyl-2-thio-2,5(3,4)-thiazoledione.
Recrystallizing solvent: Chloroform/petroleum ether mixture.
Appearance of dye: Deep pink powder.
Melting point: 230° C.

This dye sensitized a gelatino-silver chloride emulsion with a maximum at 510 mμ and a gelatino-silver bromide emulsion with a maximum at 540 mμ.

*Example 19.*—[2 - (3 - ethylbenzoxazole)][4 - (3 - cyclohexyl - 2 - thio - 2,5(3,4) - thiazole - dione)]dimethinemerocyanine

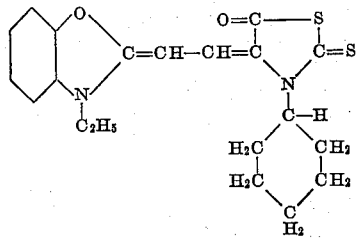

Intermediate of Formula II: 2-β-acetanilidovinylbenzoxazole ethiodide.
Intermediate of Formula III: 3-cyclohexyl-2-thio-2,5(3,4)-thiazoledione.
Recrystallizing solvent: Benzene/petroleum ether mixture.
Appearance of dye: Glittering garnet plates.
Melting point: 222° C.

This dye sensitized a gelatino-silver chloride emulsion with a maximum at 530 mμ and a gelatino-silver bromide emulsion with a maximum at 550 mμ.

*Example 20.*—[2 - (3 - ethylbenzothiazole)] - [4 - (3 - cyclohexyl - 2 - thio - 2,5(3,4) - thiazoledione)]dimethinemerocyanine

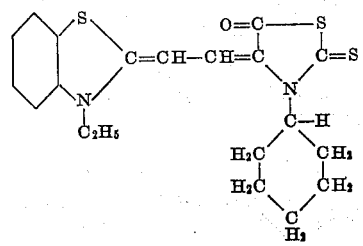

Intermediate of Formula II: 2-β-acetanilidovinylbenzothiazole ethiodide.
Intermediate of Formula III: 3-cyclohexyl-2-thio-2,5(3,4)-thiazoledione.
Recrystallizing solvent: Benzene/petroleum ether mixture.
Appearance of dye: Bright green prisms.
Melting point: 217° C.

This dye sensitized a gelatino-silver chloride emulsion with a maximum at 560 mμ and a gelatino-silver bromide emulsion with a maximum at 590 mμ.

*Example 21.*—[2 - (3 - methylthiazoline)][4 - (3 - cyclohexyl - 2 - thio - 2,5(3,4) - thiazoledione)]dimethinemerocyanine

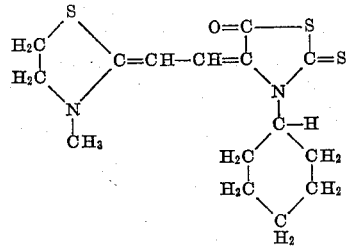

Intermediate of Formula II: 2-β-acetanilidovinylthiazoline methiodide.
Intermediate of Formula III: 3-cyclohexyl-2-thio-2,5(3,4)-thiazoledione.
Recrystallizing solvent: Pyridine/petroleum ether mixture.
Appearance of dye: Maroon needles.
Melting point: 306° C.

This dye sensitized a gelatino-silver chloride emulsion with a maximum at 500 mμ and a gelatino-silver bromide emulsion with a maximum at 530 mμ.

*Example 22.*—[2 - (3 - ethylthiazoline)][4 - (3 - cyclohexyl - 2 - thio - 2,5(3,4) - thiazoledione)]dimethinemerocyanine

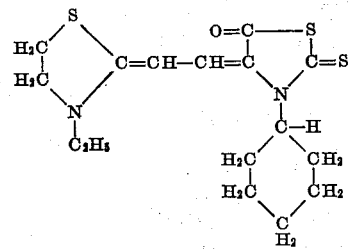

Intermediate of Formula II: 2-β-acetanilidovinylthiazoline ethiodide.
Intermediate of Formula III: 3-cyclohexyl-2-thio - 2,5(3,4)-thiazoledione.
Recrystallizing solvent: Ethanol/diethyl ether mixture.
Appearance of dye: Turquoise-blue prisms.
Melting point: 230–231° C.

This dye sensitized a photographic silver chloride emulsion with a maximum at 500 mμ and a gelatino-silver bromide emulsion with a maximum at 530 mμ.

*Example 23.*—[2-(1-ethylquinoline)][4-(3-cyclohexyl - 2 - thio - 2,5(3,4) - thiazoledione)] dimethinemerocyanine

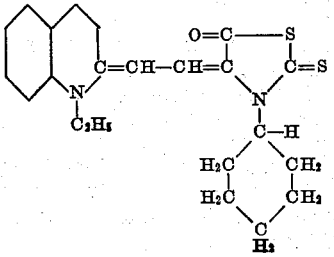

Intermediate of Formula II: 2-β-acetanilidovinylquinoline ethiodide.
Intermediate of Formula III: 3-cyclohexyl-2-thio-2,5(3,4)-thiazoledione.
Recrystallizing solvent: Pyridine.
Appearance of dye: Flat gold needles.
Melting point: 264° C.

*Example 24.*—[2-(3-ethylbenzoxazole)][4-(3-n-heptyl-2-thio-2,5(3,4)-thiazoledione)] dimethinemerocyanine

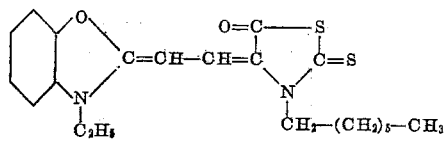

Intermediate of Formula II: 2-β-acetanilidovinyl benzoxazole ethiodide.
Intermediate of Formula III: 3-n-heptyl-2-thio-2,5(3,4)-thiazoledione.
Recrystallizing solvent: Ethanol.
Appearance of dye: Orange-red needles.
Melting point: 143° C.

This dye sensitized a gelatino-silver chloride emulsion with a flat maximum lying between 500 and 540 mμ, and a gelatino-silver bromide emulsion with a maximum at 560° C.

*Example 25.*—[2 - (3 - ethylbenzothiazole)][4-(3 - n - heptyl - 2 - thio - 2,5(3,4) - thiazoledione)] dimethinemerocyanine

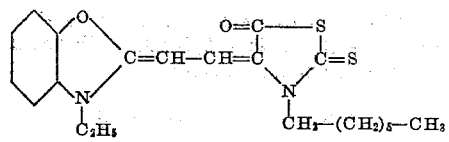

Intermediate of Formula II: 2-β-acetanilidovinylbenzothiazole ethiodide.
Intermediate of Formula III: 3-n-heptyl-2-thio-2,5(3,5)-thiazoledione.
Recrystallizing solvent: Ethanol.
Appearance of dye: Gold plates.
Melting point: 156° C.

This dye sensitized a gelatino-silver chloride emulsion with a maximum at 590 mμ, and a gelatino-silver bromide emulsion with a maximum at 590 mμ.

*Example 26.*—[2 - (3 - ethylbenzoselenazole)][4-(3 - n - heptyl - 2 - thio - 2,5(3,4) - thiazoledione)] dimethinemerocyanine

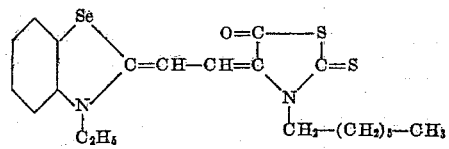

Intermediate of Formula II: 2-β-acetanilidovinylbenzoselenazole ethiodide.
Intermediate of Formula III: 3-n-heptyl-2-thio-2,5(3,4)-thiazoledione.
Recrystallizing solvent: Ethanol.
Appearance of dye: Gold plates.
Melting point: 136° C.

This dye sensitized a gelatino-silver chloride emulsion with a maximum at 590 mμ and a gelatino-silver bromide emulsion with a maximum at 610 mμ.

*Example 27.*—[2 - (1 - ethyl - β - naphthothiazole)][4 - (3 - n - heptyl - 2 - thio-2,5(3,4)-thiazoledione)] dimethinemerocyanine

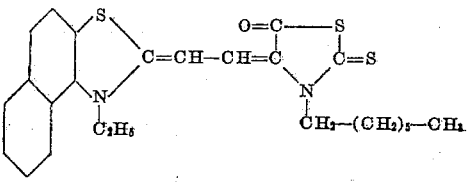

Intermediate of Formula II: 2-β-acetanilidovinyl-β-naphthothiazole ethiodide.
Intermediate of Formula III: 3-n-heptyl-2-thio-2,5(3,4)-thiazoledione.
Recrystallizing solvent: Benzene/petroleum ether mixture.
Appearance of dye: Green-gold powder.
Melting point: 210 C.

This dye sensitized a gelatino-silver chloride emulsion with a maximum at 610° C.

*Example 28.*—[2 - (1,3,3 - trimethylindolemine)]-[4 - (3 - n - heptyl - 2 - thio - 2,5(3,4) - thiazoledione)] dimethinemerocyanine

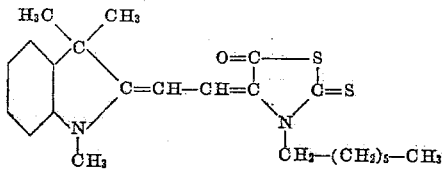

Intermediate of Formula II: 2-β-acetanilidovinyl-3,3-dimethylindolenine methiodide.
Intermediate of Formula III: 3-n-heptyl-2-thio-2,5(3,4)-thiazoledione.
Recrystallizing solvent: Ethanol.
Appearance of dye: Yellow-green needles.
Melting point: 117° C.

This dye sensitized both a gelatino-silver chloride emulsion and a gelatino-silver bromide emulsion with a maximum at 580 mμ.

*Example 29.*—[2 - (3 - methylthiazoline)][4 - (3-n - heptyl - 2 - thio - 2,5(3,4) -thiazoledione)] dimethinemerocyanine

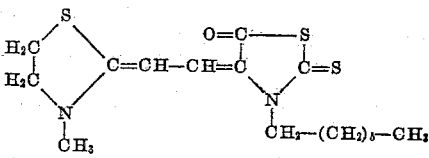

Intermediate of Formula II: 2-β-acetanilidovinylthiazoline methiodide.
Intermediate of Formula III: 3-n-heptyl-2-thio-2,5(3,4)-thiazoledione.
Recrystallizing solvent: Ethanol.
Appearance of dye: Pale green needles.
Melting point: 119° C.

This dye sensitized both a gelatino-silver chloride emulsion and a gelatino-silver bromide emulsion with a maximum at 530 mμ.

*Example 30.*—[2 - (3 - ethylthiazoline)][4 - (3-methyl - 2 - thio - 2,5(3,4) - thiazoledione)] dimethinemerocyanine

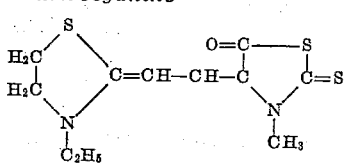

Intermediate of Formula II: 2-β-acetanilidovinylthiazoline ethiodide.

Intermediate of Formula III: 3-methyl-2-thio-2,5(3,4)-thiazoledione.
Recrystallizing solvent: Benzene/petroleum ether mixture.
Appearance of dye: Glittering chocolate needles.
Melting point: 216° C.

This dye sensitized both a gelatino-silver chloride emulsion and a gelatino-silver bromide emulsion with a maximum at 530 mμ.

*Example 31.*—[2 - (1,3,3 - trimethylindolenine)] [4 - (3 - methyl - 2 - thio - 2,5(3,4) - thiazoledione)] dimethinemerocyanine

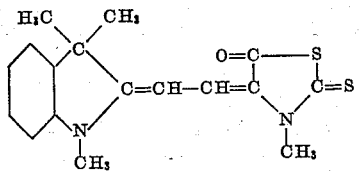

Intermediate of Formula II: 2-β-acetanilidovinyl-3,3-dimethylindolenine methiodide.
Intermediate of Formula III: 3-methyl-2-thio-2,5(3,4)-thiazoledione.
Recrystallizing solvent: Benzene/petroleum ether mixture.
Appearance of dye: Flat yellow-green needles.
Melting point: 260° C.

This dye sensitized both a gelatino-silver chloride emulsion and a gelatino-silver bromide emulsion with a maximum at 580 mμ.

Certain of the intermediates used in the above examples have not been previously described. The following examples illustrate methods for preparing these compounds.

*Example 32.*—3-ethyl-2-thio - 2,5(3,4) - thiazoledione

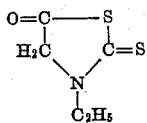

18.3 cc. of a 33 percent (by weight) solution of ethylamine in ethanol were added to 10 cc. of methanol. To this solution there was added a solution of 5.7 g. of glycolonitrile in 10 cc. of methanol. The reaction mixture was allowed to stand for 24 hours at room temperature, and the ethanol and methanol removed under vacuum. The product was distilled off at 41–42° C./3 mm. There were thus obtained 5.0 g. (49 percent of theoretical) of ethylaminoacetonitrile.

33.0 g. of ethylaminoacetonitrile obtained as described above were dissolved in 50 cc. of methanol. The solution was cooled in an ice-bath, and the air in the flask displaced with an atmosphere of nitrogen. A solution of 30.0 g. of carbon disulfide in 50 cc. of methanol was slowly added, and the reaction mixture allowed to stand for 30 minutes. It was then poured into 400 cc. of 4N-hydrochloric acid and shaken vigorously for 5 minutes. The desired 3-ethyl-2-thio-2,5(3,4)-thiazoledione separated as a yellow solid melting at 63° C. The yield amounted to 38.0 g., or 60 percent of the theoretical.

*Example 33.*—3 - cyclohexyl - 2 - thio - 2,5(3,4) - thiazoledione

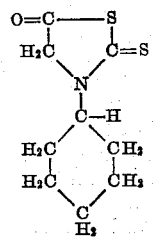

A solution of 51.0 g. of cyclohexylamine in 50 cc. of methanol was added to a solution of 29.0 g. of glycolonitrile in 50 cc. of methanol. The reaction mixture was allowed to stand at room temperature for 24 hours. The methanol was then distilled off under a vacuum, and the product distilled off at 74–86° C./1 mm. There were thus obtained 65 g. of cyclohexylaminoacetonitrile. It had a melting point of 18° C.

A solution of 6.9 g. of cyclohexylaminoacetonitrile in 10 cc. of methanol was cooled in an ice bath, and the air in the flask displaced with nitrogen. A solution of 3.8 g. of carbon disulfide in 5 cc. of methanol was slowly added, and the solution allowed to stand for 30 minutes. The reaction mixture was poured into 60 cc. of 4N-hydrochloric acid, shaken vigorously for 5 minutes, and then chilled. The precipitate was collected on a filter. The desired product was obtained as a solid melting at 114° C.

*Example 34a.*—3 - n - heptyl - 2 - thio - 2,5(3,4) - thiazoledione

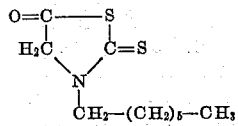

A solution of 100 g. of n-heptylamine in 50 cc. of methanol was added to a solution of 45 g. of glycolonitrile in 50 cc. of methanol, and the reaction mixture allowed to stand at room temperature for 24 hours. The methanol was then removed under vacuum, and the residue distilled at 104–107° C./14 mm. to give 110 g. of n-heptylaminoacetonitrile.

A solution of 15.4 g. of n-heptylaminoacetonitrile in 30 cc. of methanol was chilled in an ice-bath and the air in the flask displaced with nitrogen gas. A solution of 7.6 g. of carbon disulfide in 30 cc. of methanol was slowly added, and the reaction mixture allowed to stand for 30 minutes. It was then poured into 100 cc. of 4N-hydrochloric acid, shaken vigorously for 5 minutes, chilled, and filtered. The desired product was obtained as a waxy solid.

*Example 34b.*—3-n-heptyl-2-thio-2,5(3,4)-thiazoledione-alternate method 47.0 g. of n-heptylaminoacetonitrile were dripped into an ice-cold mixture of 8.1 cc. of concentrated sulfuric acid in 70 cc. of ethanol with stirring. The product was filtered off and dried. It weighed 50 g. and had a melting point of 134–135° C. from ethanol. This solid was added slowly to 130 cc. of concentrated sulfuric acid, and the mixture heated for 1 hour on a steam bath. It was then cooled and run into 800 cc. of ice-cold ethanol. The desired n-heptylglycineamide hydrogen sulfate (61.5 g.) separated. It had a melting point of 163° C. on recrystallization from ethanol. It was suspended in methanol and then neutralized to phenolphthalein with sodium methoxide. The sodium sulfate formed was filtered off and the alcohol removed from the filtrate. The free base, n-heptylglycineamide, slowly solidified, and was recrystallized from ligroin as glossy plates (30.0 g.) having a melting point of 52° C. This product was dissolved in 50 cc. of methanol, the solution cooled in an ice bath, and 13.5 g. of carbon disulfide added. The desired 3 - n-heptyl-2-thio-2,5(3,4)-thiazoledione separated as a solid melting at 115° C. It weighed 27.0 g. and could not be recrystallized without decomposition.

The following method in addition to that described above was found to be advantageous for the preparation of merocyanine dyes from the product of Example 34b.

1.37 g. of phosphorustrichloride were added to 2.4 g. of the solid obtained in Example 34b in 12 cc. of dry benzene. The mixture was heated on a steam bath for 10 minutes with good mixing. To the resultant gel were added 24 cc. of ethanol, 4 cc. of triethylamine and 0.01 mol. of one of the intermediates of Formula II above. The solution was heated on a steam bath for 15 minutes, and all solvent removed under reduced pressure. The resultant dye was then extracted from the residue with ethanol. The solution was then chilled and the dye collected on a filter.

By replacing the amines of Examples 32–34a by other amines, such as n-propylamine, isopropylamine, n-butylamine, isobutylamine, n-amylamine, n-octylamine, cyclopropylamine, cyclobutylamine, cyclopentylamine, etc. other intermediates coming within the scope of Formula III above can be prepared.

We have found that our new dyes spectrally sensitize photographic silver halide emulsions when incorporated therein. The dyes are especially useful for extending the spectral sensitivity of the customarily employed gelatino-silver-chloride, gelatino-silver chlorobromide, gelatino-silver-bromide and gelatino-silver bromiodide developing-out emulsions. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of our new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What we claim as our invention and desire secured by Letters Patent of the United States is:

1. A merocyanine dye selected from those represented by the following general formula:

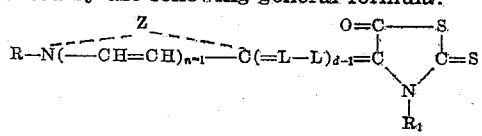

wherein R and R₁ each represents an alkyl group containing from 1 to 8 carbon atoms, L represents a methine group, n represents a positive integer from 1 to 2, d represents a positive integer from 1 to 3, and Z represents the non-metallic atoms necessary to complete a heterocyclic nucleus selected from the group consisting of those of the thiazole series, those of the benzothiazole series, those of the naphthothiazole series, those of the thionaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, and those of the pyridine series.

2. The merocyanine dye represented by the following formula:

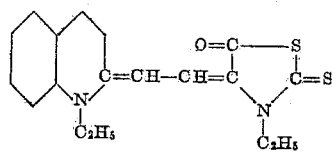

3. The merocyanine dye represented by the following formula:

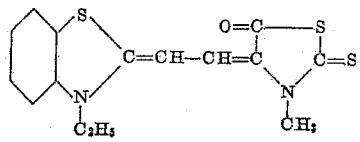

4. The merocyanine dye represented by the following formula:

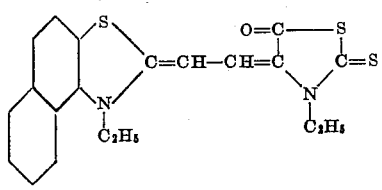

5. The merocyanine dye represented by the following formula:

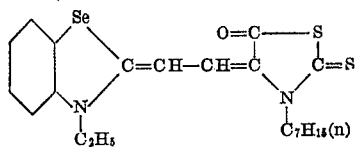

6. The merocyanine dye represented by the following formula:

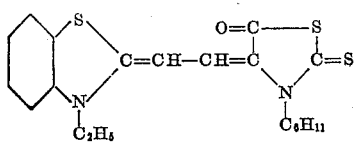

7. A method for making merocyanine dyes comprising condensing a 2-thio-2,5(3,4)-thiazole selected from those represented by the following general formula:

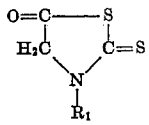

wherein $R_1$ represents an alkyl group containing from 1 to 8 carbon atoms with a cyclammonium quaternary salt selected from those having the following general formula:

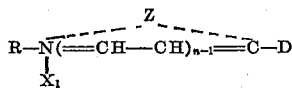

wherein R represents an alkyl group, $X_1$ represents an acid radical, $n$ represents a positive integer of from 1 to 2, Z represents the non metallic atoms necessary to complete a heterocyclic nucleus containing from 5 to 6 atoms in the heterocyclic ring and D represents a member selected from the group consisting of an alkylmercapto group, an arylmercapto group, a β-arylaminovinyl group, and a δ-arylamino-1,3-butadienyl group.

8. A method according to claim 7 for making merocyanine dyes comprising condensing a 2-thio-2,5(3,4)-thiazoledione with a 2-β-acetanilidovinylquinoline alkyl salt wherein the alkyl group is an alkyl group of the formula $C_mH_{2m+1}$ wherein $m$ represents a positive integer of from 1 to 8.

9. A method according to claim 7 for making merocyanine dyes comprising condensing a 2-thio-2,5(3,4)-thiazoledione with a 2-β-acetanilidovinylbenzothiazole alkyl salt wherein the alkyl group is the alkyl group of the formula $C_mH_{2m+1}$ wherein $m$ represents a positive integer of from 1 to 8.

10. A method according to claim 7 for making merocyanine dyes comprising condensing a 2-thio-2,5(3,4)-thiazoledione with a 2-β-acetanilidovinylnaphthothiazole alkyl salt wherein the alkyl group is the alkyl group of the formula $C_mH_{2m+1}$ wherein $m$ represents a positive integer of from 1 to 8.

11. A method according to claim 7 for making merocyanine dyes comprising condensing a 2-thio-2,5(3,4)-thiazoledione with a 2-β-acetanilidovinylbenzoselenazole alkyl salt wherein the alkyl group is the alkyl group of the formula $C_mH_{2m+1}$ wherein $m$ represents a positive integer of from 1 to 8.

12. A method according to claim 7 for making merocyanine dyes comprising condensing a 3-cycloalkyl-2-thio-2,5(3,4)-thiazole wherein the cycloalkyl group contains from 3-6 carbon atoms in the cycloalkyl ring with a 2-β-acetanilidovinylbenzothiazole alkyl salt wherein the alkyl group is an alkyl group of the formula $C_mH_{2m+1}$ wherein $m$ represents a positive integer of from 1 to 8.

ROY A. JEFFREYS.
EDWARD B. KNOTT.

References Cited in the file of this patent

UNITED STATES PATENTS

| Number | Name | Date |
|---|---|---|
| 2,078,233 | Brooker | Apr. 27, 1937 |
| 2,170,804 | Brooker | Aug. 29, 1939 |

OTHER REFERENCES

Cook, J. Chem. Soc. (1948), pp. 1056 and 1057.
Cook, J. Chem. Soc. (1949), pp. 2342–2346 (part II).
Cook, J. Chem. Soc. (1949), pp. 1435–1437 (part III).